(12) United States Patent
Gottlieb et al.

(10) Patent No.: US 8,745,753 B1
(45) Date of Patent: Jun. 3, 2014

(54) SYSTEMS AND METHODS FOR BLOCKING OF WEB-BASED ADVERTISEMENTS

(75) Inventors: Gabriel Gottlieb, Santa Monica, CA (US); Thomas George Lorimor, Seattle, WA (US)

(73) Assignee: Adomic, Inc., Santa Monica, CA (US)

( * ) Notice: Subject to any disclaimer, the term of this patent is extended or adjusted under 35 U.S.C. 154(b) by 0 days.

(21) Appl. No.: 13/527,558

(22) Filed: Jun. 19, 2012

Related U.S. Application Data

(60) Provisional application No. 61/499,132, filed on Jun. 20, 2011.

(51) Int. Cl.
*G06F 7/04* (2006.01)
*G06F 17/30* (2006.01)
*H04N 7/16* (2011.01)

(52) U.S. Cl.
USPC ............................................ 726/26

(58) Field of Classification Search
USPC ............................................ 726/26
See application file for complete search history.

(56) References Cited

U.S. PATENT DOCUMENTS

| | | | |
|---|---|---|---|
| 8,050,970 B2 * | 11/2011 | Barry et al. | 705/14.49 |
| 8,239,263 B2 * | 8/2012 | Axe et al. | 705/14.4 |
| 8,386,314 B2 | 2/2013 | Kirkby et al. | |
| 8,392,241 B2 | 3/2013 | Coladonato et al. | |
| 8,554,602 B1 | 10/2013 | Zohar et al. | |
| 2004/0205049 A1 | 10/2004 | Aggarwal | |
| 2005/0021397 A1 | 1/2005 | Cui et al. | |
| 2005/0222902 A1 | 10/2005 | Coit et al. | |
| 2008/0215417 A1 | 9/2008 | Young | |
| 2009/0222316 A1 | 9/2009 | Boinepalli et al. | |
| 2010/0241510 A1 | 9/2010 | Zhang | |
| 2011/0072131 A1 | 3/2011 | Zohar et al. | |
| 2011/0125587 A1 | 5/2011 | Netzer et al. | |
| 2011/0218866 A1 * | 9/2011 | Wilson | 705/14.73 |
| 2013/0018723 A1 | 1/2013 | Khanna | |

FOREIGN PATENT DOCUMENTS

EP  1662366  5/2006

* cited by examiner

*Primary Examiner* — Dant Shaifer Harriman
(74) *Attorney, Agent, or Firm* — Treyz Law Group; Louis R. Levenson; Michael H. Lyons

(57) ABSTRACT

Systems and methods are provided that discover undesired advertisements on publisher web pages and automatically block advertisers or advertising channels associated with the placement of those advertisements from placing advertisements on the publisher web pages. An advertisement discovery and blocking system may discover advertisements on a particular publisher web page and placement pathways associated with those discovered advertisements. The system may then compare the discovered advertisements and placement pathways with a set of rules in an advertiser rule list. The system may detect advertisement violations based on the comparison of the set of rules in the advertiser rule list with the discovered advertisements and placement pathways. The system may add advertisers and advertising channels associated with the detected advertisement violations to a list of blocked advertisers. The list of blocked advertisers may be provided to the publishers and the advertising channels.

20 Claims, 13 Drawing Sheets

SYSTEMS AND METHODS FOR BLOCKING OF WEB-BASED ADVERTISEMENTS

This application claims the benefit of provisional patent application No. 61/499,132, filed Jun. 20, 2011, which is hereby incorporated by reference herein in its entirety.

BACKGROUND OF THE INVENTION

This invention relates generally to web-based information and, more specifically, to blocking of web-based advertisements.

Publisher websites such as newspaper web pages, television station web pages, web log web pages, magazine web pages, social networking web pages, microblogging web pages, and other internet-based online publishing sources often include advertisements for companies and products.

Advertisements on a publisher website may include images, videos, text, animations, or other visual or audio messages. These advertisements are sometimes referred to as advertisement creatives.

Advertisements may be placed on a publisher web page by a variety of sources. As examples, an advertiser may purchase an advertisement block on the publisher web page directly from the publisher, through an advertising network, through an advertising exchange, through a demand side platform (DSP) or through some combination of these or other advertising channels.

Because of these various pathways in which an advertisement can be placed on a given publisher website, it can be difficult for publishers to keep track of which advertisers are advertising on their webpage and which advertising channels are placing advertisements on their webpage. This can be problematic for publishers that desire to prevent undesired advertisements from being displayed on the publisher's website.

It would therefore be desirable to be able to provide improved systems for detecting and blocking undesirable internet-based advertisements.

SUMMARY OF THE INVENTION

Systems and methods are provided for blocking undesired advertisements from appearing on published internet web pages.

An advertisement discovery and blocking system may include advertisement discovery equipment, storage such as cloud-based storage, internet proxy servers, data analysis and storage equipment, script generation and delivery equipment, and interface equipment for identifying advertiser advertisement rule violations and for blocking violating advertisers from placing advertisements on publisher web pages.

Advertisement data relating to which advertisers are advertising on publisher web pages and to which advertising channels are placing advertisements on publisher web pages may be gathered using the advertisement discovery equipment, or by generating and executing a monitoring script using the script generation and execution equipment.

The advertisement discovery equipment may be configured to obtain a list of publisher websites (e.g., a list of universal resource locaters (URLs)) from the cloud-based storage and access each publisher website by sending out a Hypertext Transfer Protocol (HTTP) request to the URL of each publisher website. The advertisement discovery equipment may also access some or all linked websites and some or all linked resources that are included in the publisher website associated with each URL. This process of accessing some or all of the linked websites and linked resources on one or more websites is sometimes referred to as spidering or crawling the website.

The advertisement discovery equipment may be used to detect advertisements and associated advertisers, advertisement placement pathways, and additional data such as advertiser-placed cookies to be included in processed advertisement data. The advertisement discovery equipment may provide the processed advertisement data to the data analysis and storage equipment.

The script generation and execution equipment may generate a publisher-specific monitoring script and provide related information such as a related link to a publisher server to be placed on the publisher webpage. When a user of a publisher webpage loads the publisher webpage, the placed link may cause the script generation and execution equipment to execute the publisher-specific script. Executing the publisher-specific script may send instructions to the user's browser to gather advertising data associated with the publisher webpage and to transmit the gathered advertisement data to storage such as storage associated with the data analysis and storage equipment or the cloud-based storage.

The data analysis and storage equipment may receive and accumulate the gathered advertisement data from multiple users' browsers and/or processed advertisement data from computing equipment associated with various installations of advertisement discovery equipment in various geographic locations and combine the accumulated gathered advertisement data and/or the accumulated processed advertisement data to form aggregated advertisement data.

The aggregated advertisement data may include information associated with detected advertisements and associated advertisers, advertisement placement pathways, and additional data that were placed on one or more publisher web pages over a given period of time. The additional data may include cookies such as advertiser-placed cookies or cookies that were placed by an advertising network, an advertising exchange, a demand-side-platform, a data aggregator, or other source of advertisement-linked cookies. The additional data may also include the placement pathway for each cookie.

The data analysis and storage equipment may be used to detect advertiser violations by applying an advertiser rule list to the aggregated advertisement data and to generate and/or update an advertiser block list based on the detected advertiser violations. The generated and/or updated advertiser block list may be provided to one or more advertising networks, advertising exchanges, publisher servers or other advertising channels. In this way, the advertisement discovery and blocking system may be used to block advertisers listed in the advertiser block list from placing advertisements on one or more publisher web pages.

Further features of the invention, its nature and various advantages will be more apparent from the accompanying drawings and the following detailed description of the preferred embodiments.

DETAILED DESCRIPTION

The present invention relates generally to systems and methods for blocking advertisements online and, more particularly, to systems for automatically discovering and blocking advertisements from being placed on publisher websites. Advertisements and pathways by which advertisements have been placed on publisher websites may be discovered using an advertisement discovery and blocking system.

The advertisement discovery and blocking system may generate or update a blocked advertiser list based on discovered advertisements and/or pathways that violate advertiser rules in an advertiser rule list.

Figure 1:
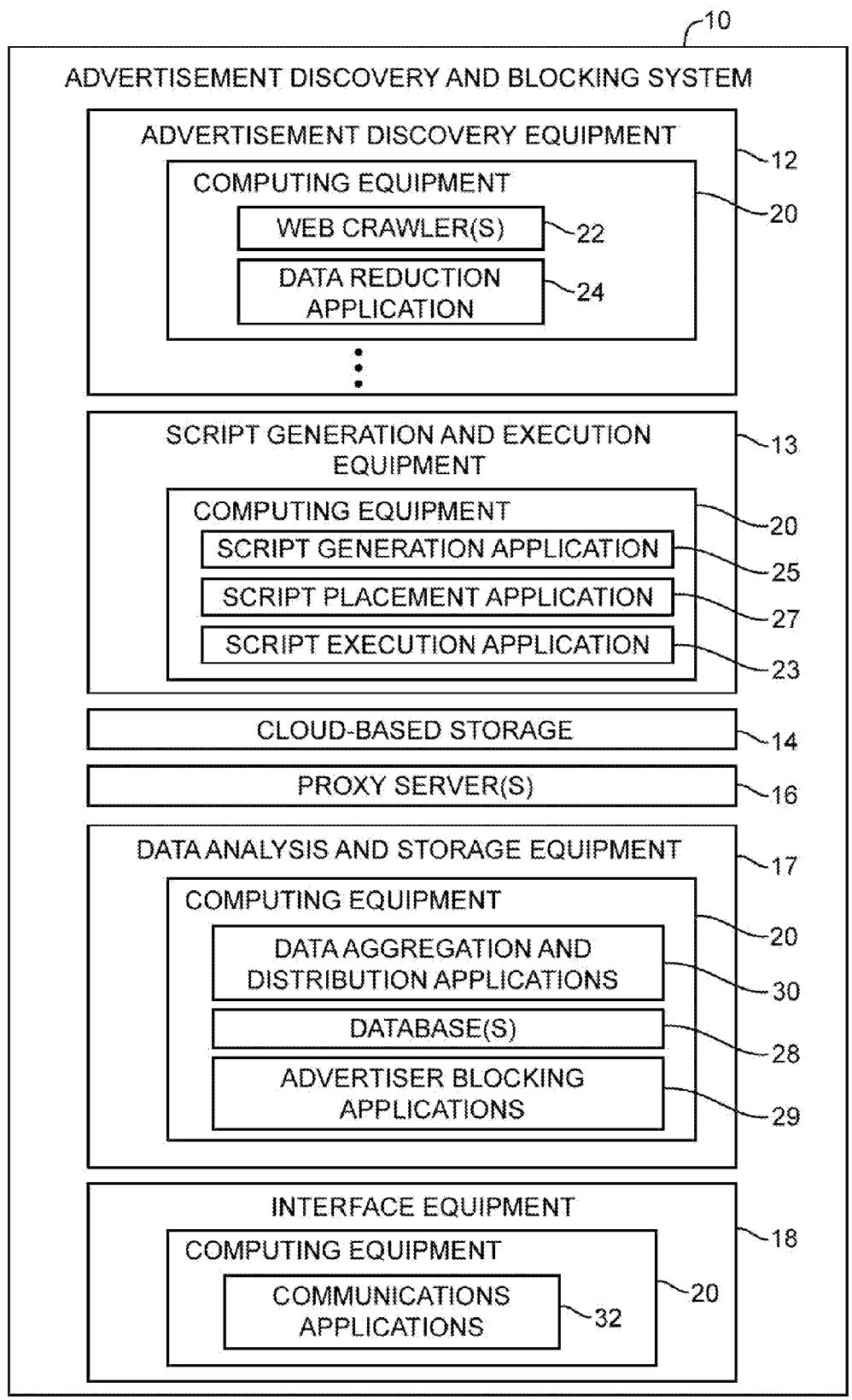
FIG. 1 is a diagram of an illustrative system for discovering and blocking web-based advertisements in accordance with an embodiment of the present invention.

An illustrative advertisement discovery and blocking system 10 is shown in FIG. 1. Advertisement discovery and blocking system 10 may include advertisement discovery equipment 12, script generation and execution equipment 13, one or more databases such as cloud-based storage 14, remote servers such as proxy servers 16, data analysis and storage equipment 17, interface equipment 18 or other computing equipment.

Advertisement discovery equipment 12 may include computing equipment 20. Computing equipment 20 may include one or more personal computers, workstations, computers configured as servers, mainframe computers, portable computers, etc. Computing equipment 20 may include processing circuitry, displays, input-output devices, and storage (e.g., hard drives, volatile memory, non-volatile memory, and other storage media). Computing equipment 20 of advertisement discovery equipment 12 may be used to run code for software applications such as one or more web crawling applications 22 and data processing applications such as data reduction application 24. Data reduction application 24 may be used to process advertisement related data that has been gathered using web crawler(s) (e.g., modified web crawling web browsers or dedicated web crawling applications).

Script generation and execution equipment 13 may include computing equipment 20. Computing equipment 20 of script generation and execution equipment 13 may be formed separately from computing equipment 20 of advertisement discovery equipment 12 or may be formed in a common computing platform with computing equipment 20 of advertisement discovery equipment 12. Computing equipment 20 of script generation and execution equipment 13 may include one or more personal computers, workstations, computers configured as servers, mainframe computers, portable computers, processing circuitry, displays, input-output devices, and storage (e.g., hard drives, volatile memory, non-volatile memory, and other storage media).

Computing equipment 20 of script generation and execution equipment may be used to run code for software applications such as script generation application 25, script placement application 27 and script execution application 23. Script generation application 25 may be used to generate a script such as a monitoring script that is specific to a given publisher and that, when executed using script execution application 23, instructs web browsers that are being used to browse a publisher website to gather and transmit advertisement data associated with the publisher website to system 10.

A script that has been generated using script generation application 25 or a link to the script may be placed on one or more publisher websites (with the permission and/or at the request of the publisher) using script placement application 27. For example, a universal resource locator (URL) associated with a script that is stored on computing equipment 20 of script generation and execution equipment 20 may be included in code such as hypertext markup language (HTML) code for the publisher's website. Script placement application 27 may be used to provide the associated URL to the publisher to be included in the code for the publisher's website.

System 10 may include storage that is co-located with computing equipment 20 of system 10 and/or remote storage such as cloud-based storage 14. If desired, advertisement discovery equipment 12 and/or data analysis and storage equipment 17 may be used to access stored information from cloud-based storage 14 and/or provide information to cloud-based storage 14. Cloud-based storage 14 may include storage media such as hard drives, volatile memory, non-volatile memory, and other storage media associated with workstations, computers configured as servers, mainframe computers, portable computers, etc.

Data analysis and storage equipment 17 may include computing equipment 20. Computing equipment 20 of data analysis and storage equipment 17 may be co-located with computing equipment 20 of advertisement discovery equipment 12 and/or computing equipment 20 of script generation and execution equipment 13 or computing equipment 20 of data analysis and storage equipment 17 may be separate from computing equipment 20 of advertisement discovery equipment 12 and/or computing equipment 20 of script generation and execution equipment 13.

As examples, computing equipment 20 of data analysis and storage equipment 17, computing equipment 20 of script generation and execution equipment 13, and computing equipment 20 of advertisement discovery equipment 12 may be implemented using a common computing platform, using two or more separate computing platforms in a common room in a building, using two or more separate computing platforms in separate rooms in a common building or using two or more separate computing platforms in a common geographic location (e.g., a common city). However, this is merely illustrative. If desired, computing equipment 20 of advertisement discovery equipment 12 may include multiple computing platforms in multiple geographic locations that are separated from computing equipment 20 of data analysis and storage equipment 17 and computing equipment 20 of script generation and execution equipment 13. For example, computing equipment 20 of advertisement discovery equipment 12 may include separate computing platforms in multiple cities that provide advertisement data to data analysis and storage equipment 17 that is located in an additional city while computing equipment 20 of script generation and execution equipment 13 is located in yet another city.

Advertisement discovery equipment 12 may use web crawler(s) 22 to access and explore publisher web pages, gather advertisement related data from those publisher web pages, process the gathered data, and provide the processed data to data analysis and storage equipment 17. Script generation and execution equipment 13 may execute a publisher-specific script when an internet user accesses a publisher website. The executed script may instruct the user's web browser to gather advertisement data associated with advertisements on the publisher webpage and to transmit the gathered advertisement data to data analysis and storage equipment 17.

Data analysis and storage equipment 17 may be used to accumulate, aggregate, and store advertisement related data. Data analysis and storage equipment 17 may be used to compare aggregated advertisement data to an advertiser rule list and identify advertiser rule violations based on that comparison. Data analysis and storage equipment 17 may be used to generate and/or update a blocked advertiser list based on the identified advertiser rule violations. Data analysis and storage equipment 17 may provide the generated and/or updated blocked advertiser list to one or more advertising channels such as advertising networks, advertising exchanges, or other advertising channels in order to block specific advertisements, specific advertisers, or specific advertising channels from placing advertisements on one or more publisher web pages.

Computing equipment 20 of data analysis and storage equipment 17 may include storage such as one or more databases 28 and other computing equipment (e.g., one or more personal computers, workstations, computers configured as servers, mainframe computers, portable computers, processing circuitry, displays and input-output devices) that can be used to run code for software applications such as one or more data aggregation and distribution applications 30 and/or one or more advertiser blocking applications 29 (e.g., rule violation detection applications and blocked advertiser list generation and updating applications). Data aggregation and distribution applications 30 may be used to accumulate and aggregate data received from advertisement discovery equipment 12 and/or users' web browsers. Advertiser blocking applications 29 may be used to identify advertiser rule violations and generate and update blocked advertiser lists based on the identified advertiser rule violations.

Interface equipment 18 may be used to provide blocked advertiser lists to advertising channels or to provide a publisher with access to advertisement related information such as aggregated advertisement data, rule violation data, or advertiser rule lists stored in data analysis and storage equipment 17. Computing equipment 20 of interface equipment 18 may include one or more personal computers, workstations, computers configured as servers, mainframe computers, portable computers, etc.

Computing equipment 20 of interface equipment 18 may include processing circuitry, displays, input-output devices, and storage (e.g., hard drives, volatile memory, non-volatile memory, and other storage media). Computing equipment 20 of interface equipment 18 may form a portion of computing equipment 20 of data analysis and storage equipment 17 or may be formed separately from computing equipment 20 of data analysis and storage equipment 17.

Computing equipment 20 of interface equipment 18 may be used to run code for software applications such as one or more communications applications 32. Communications applications 32 may be used to provide customers such as publishers with access to advertisement violation related information stored in data analysis and storage equipment 17 and, if desired, provide customers such as publishers with the ability to provide system 10 with initial advertiser block lists, advertiser rule lists, advertiser rule list updates, advertiser block list updates or other updates to be used in operating system 10.

Figure 2:
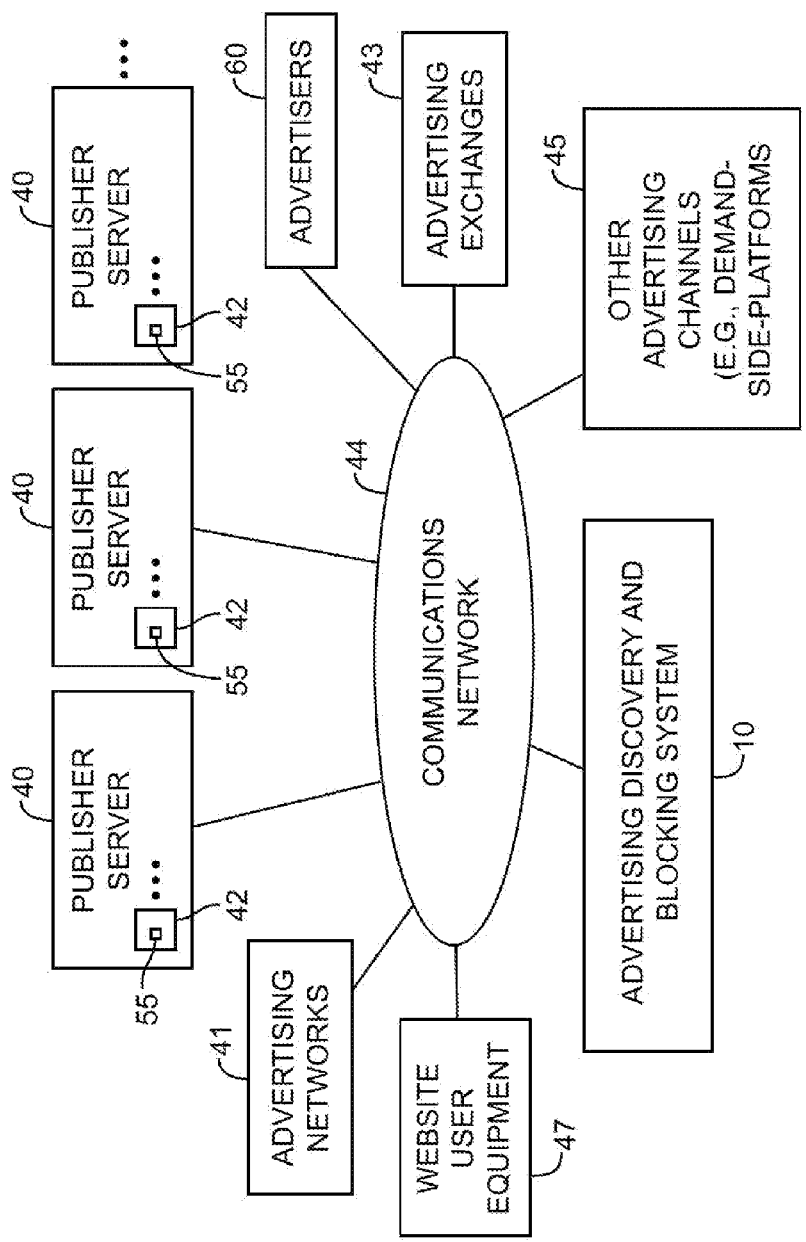
FIG. 2 is an illustrative diagram showing how portions of a system of the type shown in FIG. 1 may communicate with other portions of the system and with publisher servers and advertising channels over a communications network in accordance with an embodiment of the present invention.

FIG. 2 shows how system 10 may communicate with other portions of system 10, with publisher computing equipment such as publisher servers 40, and with advertising channels such as advertising networks 41, advertising exchanges 43, and/or other advertising channels 45 over a communications network such as communications network 44. Communications network 44 may be a local area network, a wide area network such as the internet, or a combination of one or more local area networks and a wide area network.

Advertisement discovery and blocking system 10 may communicate with publisher servers 40 over network 44 to provide a link to an advertisement discovery script, to crawl publisher web pages such as websites 42, to obtain advertisement blocking information such as initial blocked advertiser lists and advertiser rule lists, or to provide a publisher with the ability to view and/or update advertisement information such as advertiser violation information or advertiser rule lists.

For example, system 10 may use advertisement discovery equipment 12 to crawl one or more publisher websites 42 on publisher servers 40. However, this is merely illustrative. If desired, system 10 may use script generation and execution equipment 13 to place an object 55 on publisher websites 42. Object 55 may be a link to a publisher-specific monitoring script stored on script generation and execution equipment 13 or an embedded script in one of pages 42 that runs on publisher server 40 (as examples).

An object such as object 55 on a given publisher website 42 may instruct an application such as a web browser running on website user equipment 47 to gather advertisement information from a given publisher website 42. For example, when a website user accesses one of websites 42 using a web browser running on the website user's computer, the website user's browser may be instructed by object 55 to gather advertisement data associated with advertisements on that website 42 and to transmit that gathered advertisement data to system 10 over network 44.

Advertising channels such as advertising networks 41, advertising exchanges 43, and other advertising channels 45 (e.g., demand-side-platforms, etc.) may place advertisements for advertisers 60 on one or more websites 42 over network 44. Advertisement discovery and blocking system 10 may be used to detect undesirable advertisements (e.g., advertisements for competitor publishers, advertisements for controversial products, or advertisements placed by unacceptable advertising channels, etc.) on sites 42 and provide blocked advertiser lists to advertising networks 41, advertising exchanges 43 and/or other advertising channels 45 based on those detected undesirable advertisements.

Figure 3:
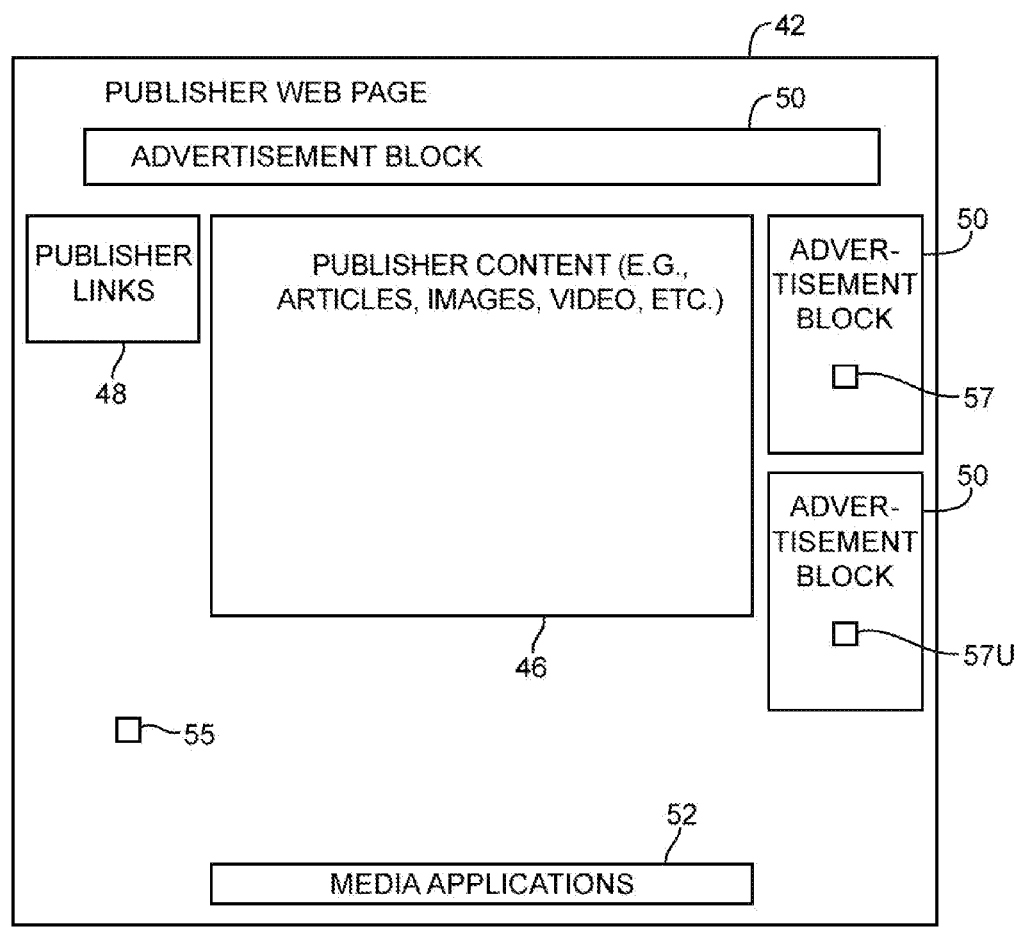
FIG. 3 is a diagram of an illustrative publisher web page having an undesirable advertisement and an embedded advertisement discovery object in accordance with an embodiment of the present invention.

FIG. 3 is a diagram of a publisher website such as one of web pages 42 of FIG. 2. As shown in FIG. 3, publisher web page 42 may include publisher content 46 (e.g., an article, a movie or an image), publisher links 48 (e.g., clickable links to other publisher web pages), media applications 52 (e.g., social networking applications), one or more advertisement blocks 50, and, if desired, an object 55 such as a link to an advertisement discovery script or an embedded advertisement discovery script. As described above in connection with FIG. 2, objects such as object 55 may be placed on website 42 using script generation and execution equipment 13 of system 10. Each advertisement block 50 may include one or more advertisements 57. Each advertisement 57 may be, as examples, an advertiser-related image, video, animation, text link, or other advertisement.

Advertisements 57 may sometimes be referred to as advertiser creatives or simply as creatives. For example, an advertiser creative may include a jpeg image of a product and an embedded clickable link to a web site that sells that product. System 10 may be used to identify advertisement blocks 50, to identify advertisers that advertise in those advertisement blocks, to record individual advertiser creatives 57 or text links displayed in those advertisement blocks, and to identify advertising channels that placed those advertiser creatives or text links in those advertisement blocks. System 10 may be used to compile, analyze and display advertisement violation information associated with undesirable advertisements such as undesirable advertisement 57U.

Undesirable advertisement 57U may, for example, be an advertisement creative for a competing publisher or competing company. For example, a first company that makes and sells shoes may not want to allow other shoe companies to advertise on their website. Similarly, a newspaper website may not want to allow advertisements for competing news organizations on their website. However, this is merely illustrative. Undesirable advertisements may include advertisements for inappropriate or illegal products or advertisements that have been placed through undesirable placement pathways.

Figure 4:
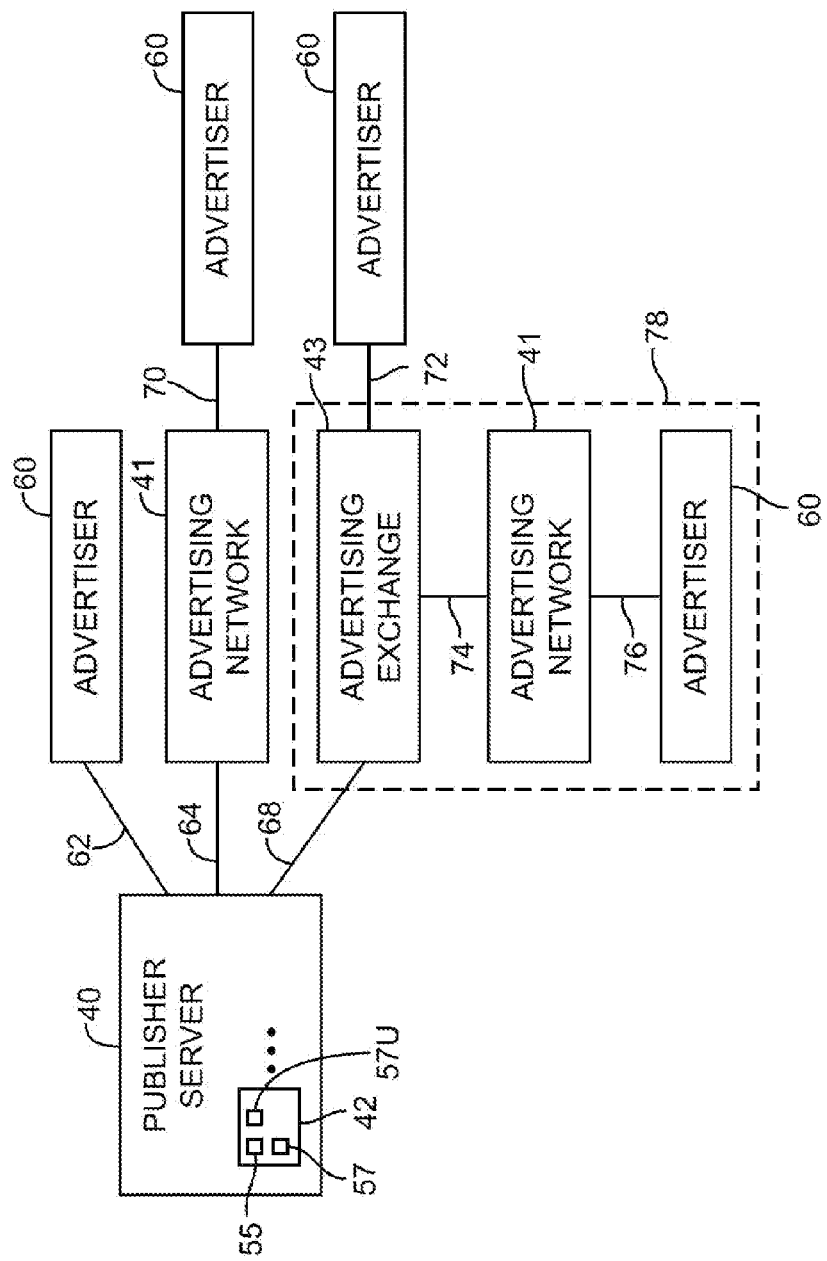
FIG. 4 is a diagram of illustrative advertisement placement pathways including an undesirable placement pathway that may be detected by a system of the type shown in FIG. 1 in accordance with an embodiment of the present invention.

An example of an undesirable placement pathway for an advertisement is shown in FIG. 4. As shown in FIG. 4, Advertisements such as advertisements 57 and undesirable advertisements 57U may be placed on a website such as publisher website 42 using several types of advertising channels. In one example, advertiser 60 may purchase advertisement space on page 42 directly from publisher 40 as indicated by line 62.

Advertisements that are placed in this way (e.g., direct-buy advertisements) are often more costly than advertisements that are placed by more indirect channels. A publisher therefore may want to block this type of direct-buy advertiser from purchasing additional advertisement space on site 42 through any other channels. System 10 may be used to detect direct-buy advertisements and other advertisements and to add an advertiser that places advertisements through direct-buy and other channels to a blocked advertiser list.

Examples of indirect channels (indirect placement pathways) through which advertisements 57 may be placed on as website such as site 42 are also shown in FIG. 4. A publisher associated with server 40 may sell remnant advertisement space (i.e., remaining advertisement space that has not been sold directly to advertisers by the publisher) to other advertising channels such as advertising networks 41 and/or advertising exchanges 43 (as indicated by respective lines 64 and 68). An advertiser such as advertiser 60 may then purchase ad space (advertisement space) on website 42 through advertising network 41 (as indicated by line 70) or through advertising exchange 43 (as indicated by line 72). However, in some situations, an advertising network may purchase advertising space that has been purchased by an advertising exchange (as indicated by line 74). An advertiser may then, knowingly or unknowingly, purchase ad space from that advertising network (as indicated by line 76). This type of multi-stage advertisement purchasing may form an undesirable advertising channel 78. System 10 may be used to detect an undesirable advertising channel such as channel 78 and add advertising networks, advertising exchanges, or advertisers involved in the undesirable advertising channel to a blocked advertiser list.

Figure 5:
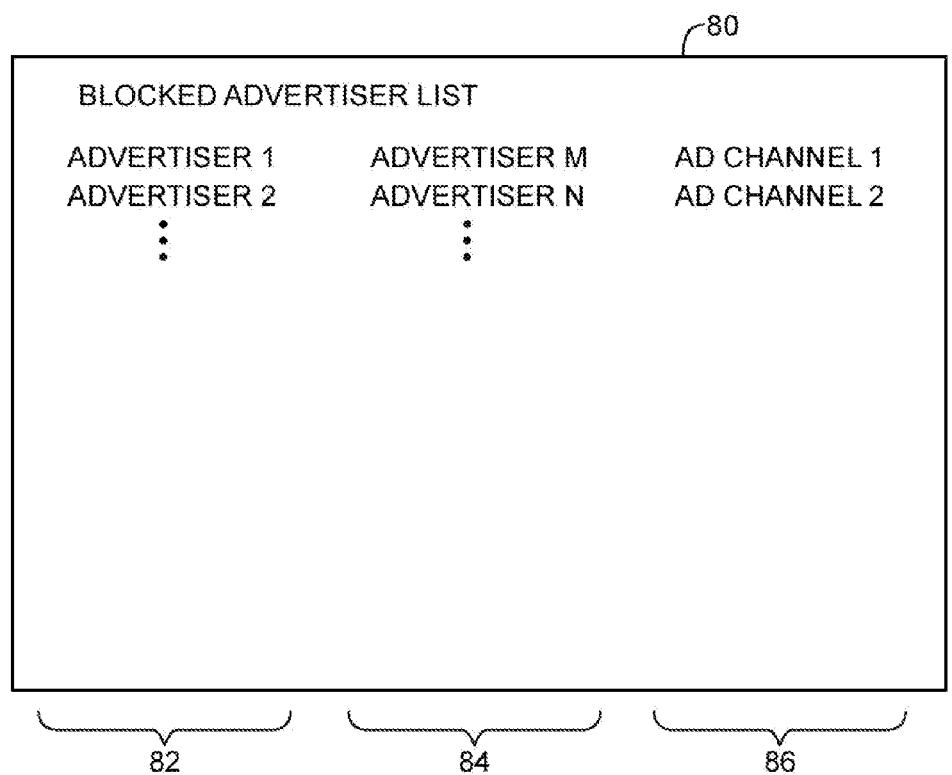
FIG. 5 is a diagram of an illustrative blocked advertiser list in accordance with an embodiment of the present invention.

An example of a blocked advertiser list is shown in FIG. 5. As shown in FIG. 5, blocked advertiser list 80 may include one or more portions such as portions 82, 84, and 86. Portion 82 may include a list of advertisers (e.g., ADVERTISER 1 and ADVERTISER 2) that are blocked from advertising on all websites associated with a given publisher through all channels. Portion 84 may include advertisers (e.g., ADVERTISER M and ADVERTISER N) that are blocked from advertising on all websites associated with a given publisher through specific advertising channels (e.g., direct-buy advertisers that are prohibited from placing ads on the publisher website through indirect advertisement channels). Portion 86 may include advertising channels ((e.g., AD CHANNEL 1 and AD CHANNEL 2) such as advertising networks and advertising exchanges that are blocked from placing advertisements on websites associated with a given publisher. However, list 80 of FIG. 5 is merely illustrative. A blocked advertiser list may include any number of advertisers and/or advertising channels arranged in any suitable number of portions.

System 10 may obtain an initial blocked advertiser list from a publisher and periodically update the blocked advertiser list based on detected violations of a set of advertiser rules. However, this is merely illustrative. If desired, system 10 may generate an initial blocked advertiser list based on detected advertisements on publisher websites and the set of advertiser rules.

Figure 6:
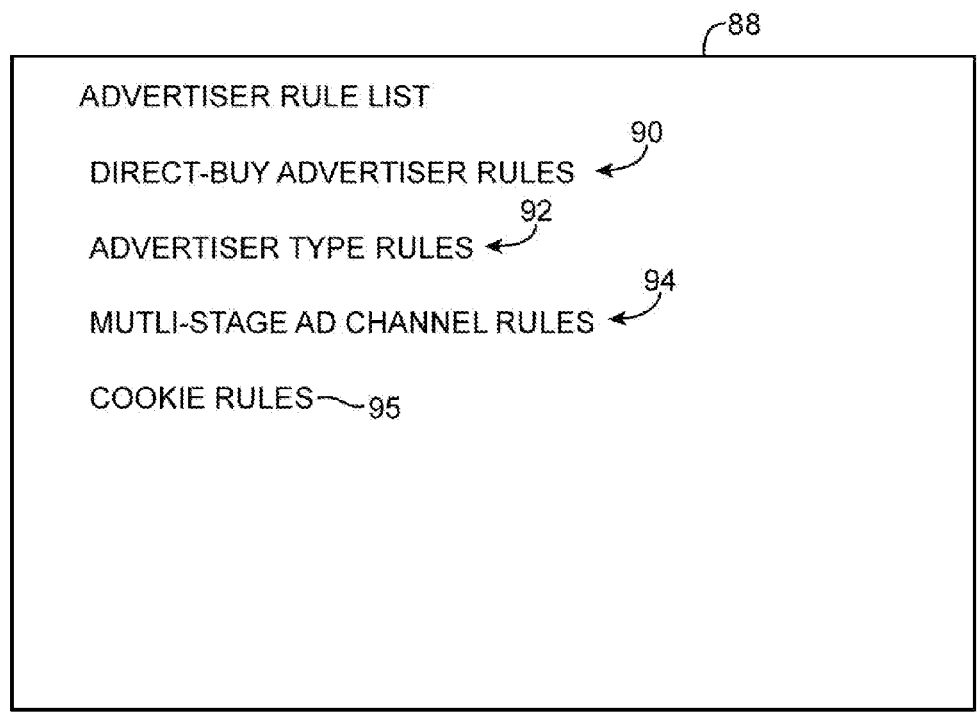
FIG. 6 is a diagram of an illustrative advertiser rule list in accordance with an embodiment of the present invention.

An example of a set of advertiser rules is shown in FIG. 6. As shown in FIG. 6, a set of advertiser rules may be stored in a list such as advertiser rule list 88. In the example of FIG. 6, advertiser rule list 88 may include direct-buy advertiser rules 90, advertiser type rules 92, multi-stage advertisement channel rules 94, cookie rules 95 (e.g., rules describing whether an advertiser, an advertising network, an advertising exchange, a DSP, etc. is allowed to include cookies with advertisements placed on a given publisher website), or other rules that describe violations for which violating advertisers may be blocked from placing advertisements on publisher websites. Advertiser rule list 88 may be, as an example, provided by a publisher to system 10. However, this is merely illustrative. If desired, system 10 may be used to generate a default rule list.

Figure 7:
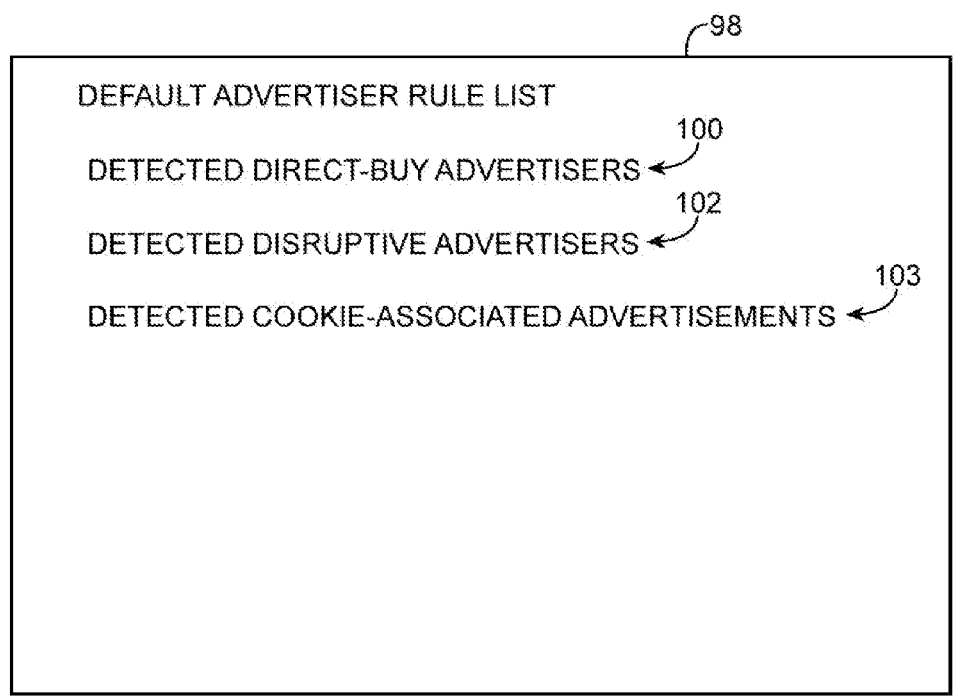
FIG. 7 is a diagram of an illustrative default advertiser rule list in accordance with an embodiment of the present invention.

An example of a default rule list is shown in FIG. 7. In the example of FIG. 7, default advertiser rule list 98 includes instructions to block detected direct-buy advertisers 100, detected disruptive advertisers 102, and detected cookie-associated advertisements 103 (e.g., advertisements that include a cookie to be dropped on a user's system). System 10 may detect advertisements, related advertising channels, and other related advertisement information on a publisher website and apply default rule list 98 to the detected advertisements, related advertising channels, and other related advertisement information to generate an initial blocked advertiser list to be provided to one or more advertising channels.

System 10 may block direct buy advertisers such as detected direct-buy advertisers 100 from placing ads on the publisher website through other channels. System 10 may block disruptive advertisers such as disruptive advertisers 102 from placing any advertisements on any publisher web pages for a specified amount of time (e.g., a day, a week, a month, etc.) Disruptive advertisers 102 may include advertisers who place overly aggressive or flashy ads and advertisers who include tracking objects (e.g., cookies) in advertisements that are downloaded onto a user's computer for tracking that user's activity on the internet. System 10 may block advertisers and/or advertising channels that include tracking pixels such as cookies with a placed advertisement from placing any advertisements on any publisher web pages for a specified amount of time (e.g., a day, a week, a month, etc.)

Default advertiser rule list 98 of FIG. 7 is merely illustrative. If desired, system 10 may generate a default rule list containing any number of rules suitable for blocking undesired advertisements from appearing on a publisher webpage.

During operation, system 10 may generate an initial blocked advertiser list by detecting all direct-buy advertisements on a website such as website 42, matching all detected direct-buy advertisements to their associated advertisers, and adding the associated advertisers to a portion of the initial blocked advertiser list that lists advertisers that are prohibited from purchasing remnant advertising space on site 42. System 10 may then periodically gather advertisement data from publisher websites, update the blocked advertiser list, and provide the updated blocked advertiser list to one or more advertising channels and/or publishers.

Figure 8:
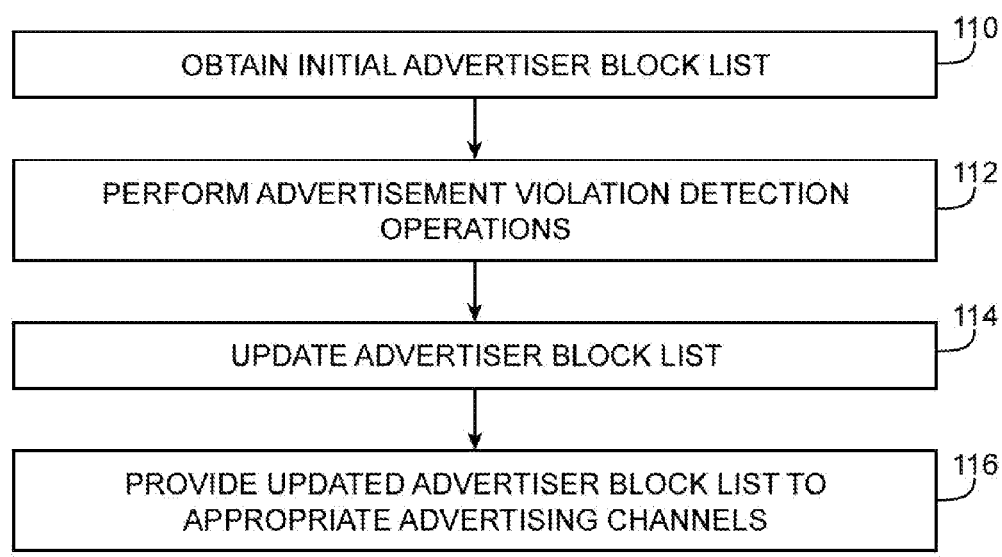
FIG. 8 is a flow chart of illustrative steps that may be used in discovering and blocking advertisements in accordance with an embodiment of the present invention.

Illustrative steps that may be involved in discovering and blocking advertisements on publisher websites are shown in FIG. 8.

At step 110, a system such as system 10 of FIG. 1 may be used to obtain an initial advertiser block list such as blocked advertiser list 80 of FIG. 5.

At step 112, system 10 may be used to perform advertisement violation detection operations.

At step 114, system 10 may be used to update an advertiser block list such as the initial advertiser block list or a previously updated advertiser block list based on advertisement violations detected at step 112.

At step 116, system 10 may be used to provide the updated advertiser block list to appropriate advertising channels such as advertising networks, advertising exchanges, or other advertising channels that handle advertisements for the blocked advertisers.

Figure 9:
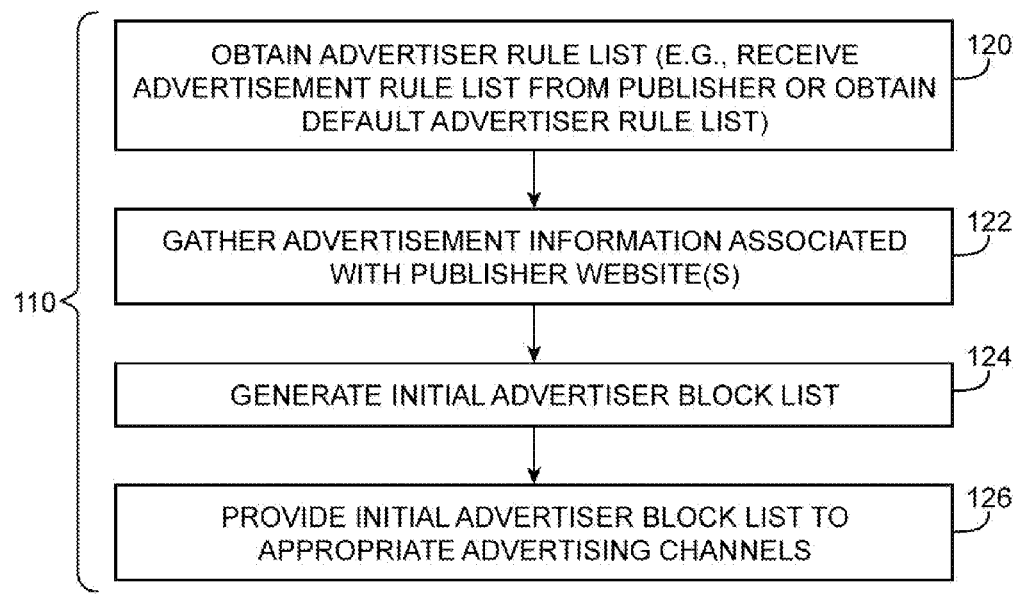
FIG. 9 is a flow chart of illustrative steps that may be used in generating an initial blocked advertiser list in accordance with an embodiment of the present invention.

Illustrative steps that may be involved in obtaining an initial advertiser block list as described above in connection with step 110 of FIG. 8 are shown in FIG. 9.

At step 120, system 10 may obtain an advertiser rule list. As examples, system 10 may receive an advertiser rule list such as list 88 of FIG. 6 from a publisher, or system 10 may generate a default rule list such as advertiser rule list 98 of FIG. 7.

At step 122, system 10 may gather advertisement information associated with one or more publisher websites. Advertisement information may include information associated with one or more advertisement creatives, associated advertisers, associated advertisement channels that placed the advertisement creatives, and/or associated objects such as cookies that are coupled to the advertisement creatives on the publisher websites. The advertisement information may be gathered using advertisement discovery equipment 12 and/or script generation and execution equipment 13 of FIG. 1.

At step 124, system 10 may generate the initial advertiser block list by comparing the gathered advertisement information with the advertiser rule list obtained at step 120.

At step 126, system 10 may be used to provide the initial advertiser block list to appropriate advertising channels and/or to the publisher. However, the steps of FIG. 9 are merely illustrative. If desired, system 10 may receive the initial blocked advertiser list from the publisher.

Figure 10:
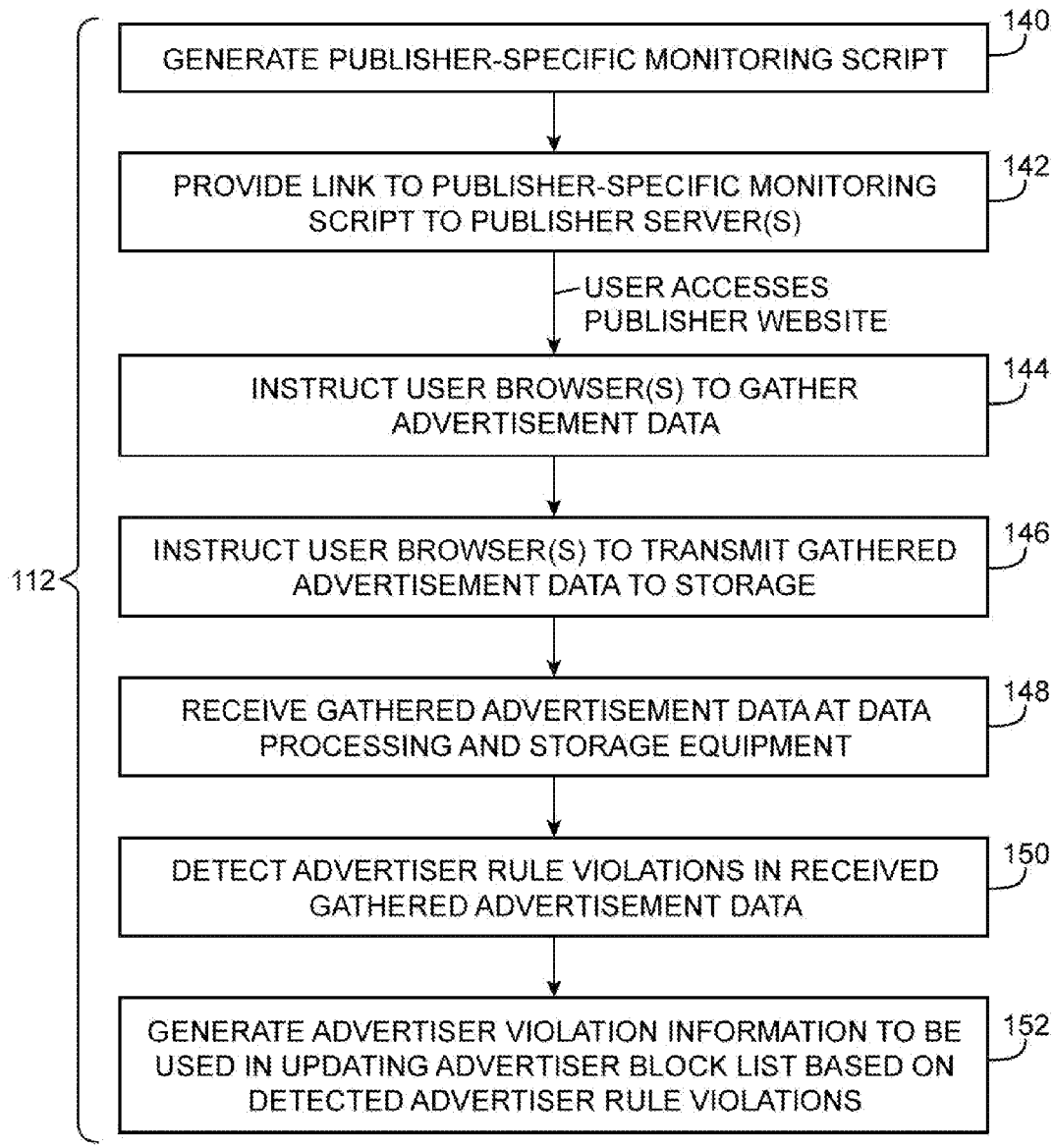
FIG. 10 is a flow chart of illustrative steps that may be used in performing advertisement violation detection operations using script generation and execution equipment in accordance with an embodiment of the present invention.

Illustrative steps that may be involved in performing advertisement violation detection operations as described above in connection with step 112 of FIG. 8 using script generation and execution equipment 13 are shown in FIG. 10.

At step 140, script generation and execution equipment 13 may be used to generate a monitoring script such as a publisher-specific monitoring script for instructing web browsers of publisher website users to gather and transmit advertiser information from publisher websites to system 10.

At step 142, script generation and execution equipment 13 may be used to provide a link associated with the generated publisher-specific monitoring script to one or more publisher servers such as servers 40 of FIG. 2, to be included in publisher websites 42.

At step 144, in response to a user of one of sites 42 accessing the site 42, script generation and execution equipment 13 may instruct the user's browser to gather advertisement data associated with advertisements on the publisher website. Gathering the advertisement data may include gathering HTTP request data such as request URLs, request response headers, response bodies, and request times associated with HTTP requests made while loading the publisher websites.

At step 146, script generation and execution equipment 13 may be used to instruct the user's browser to transmit the gathered advertisement data to storage such as storage associated with data analysis and storage equipment 17 and/or cloud-based storage 14.

At step 148, the gathered advertisement data may be received by data analysis and storage equipment 17. Gathered advertisement data may be retrieved by data storage and processing equipment from cloud-based storage 14 or may be provided directly to data analysis and storage equipment 17 from the user's browser.

At step 150, data analysis and storage equipment 17 may be used to detect advertiser rule violations in the received gathered advertisement data.

At step 152, data analysis and storage equipment 17 may be used to generate advertiser violation information to be used in updating a blocked advertiser list such as list 80 of FIG. 5 based on the advertiser rule violations detected at step 150.

Figure 11:
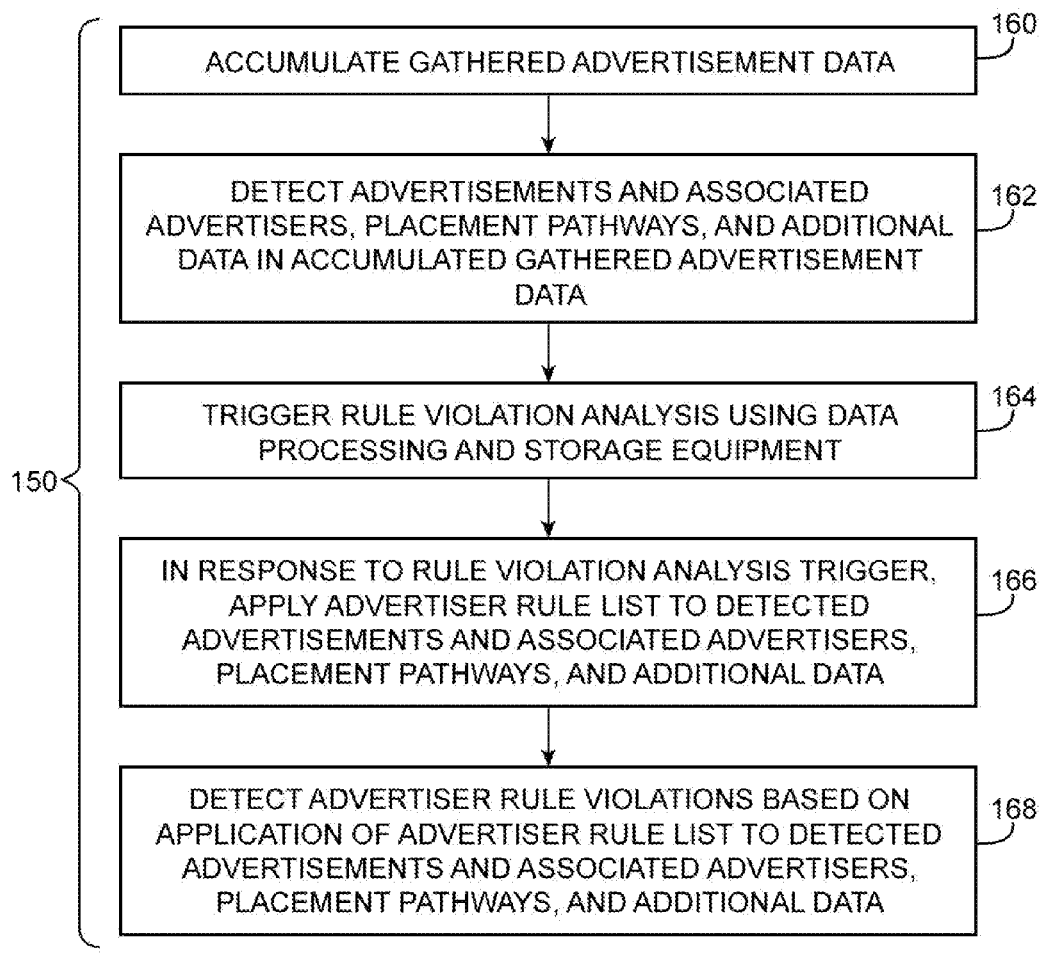
FIG. 11 is a flow chart of illustrative steps that may be used in detecting advertiser rule violations using gathered advertisement data from user browsers in accordance with an embodiment of the present invention.

Illustrative steps that may be involved in detecting advertiser rule violations in received gathered advertisement data as described above in connection with step 150 of FIG. 10 are shown in FIG. 11.

At step 160, data analysis and storage equipment 17 may be used to accumulate gathered advertisement data from one or more user's browsers for a given period of time (e.g., a day, a week, a month, less than one day, more than one day, less than one week, more than one week, etc.).

At step 162, data analysis and storage equipment 17 may be used to detect advertisements and associated advertisers, placement pathways, and additional data such as advertiser cookies in the accumulated gathered advertisement data.

Data analysis and storage equipment 17 may detect advertisements and associated advertisers, placement pathways, and additional data such as advertiser cookies by detecting advertisements in request URLs, determining an advertisement request time associated with each detected advertisement, and searching response bodies and/or redirect response headers of other requests having times that are the same as or earlier than the advertisement request time to identify placement pathways by which discovered advertisements have been placed and to identify additional data (e.g., advertiser cookies) associated with each advertisement. Each placement pathway may include one or more advertising channels or combinations of advertising channels.

Data analysis and storage equipment 17 may generate processed advertisement data such as data trees and advertisement-block specific data and aggregate that processed advertisement data. Data trees may include the identified placement pathways for advertisements (and other content) on each publisher website. Advertisement-block specific data may include advertiser names, advertisement creative files (e.g., image files), landing page info (e.g., a website of a company that sells or produced the advertised product), the location of the advertisement (e.g., pixel coordinates) on the publisher website, tracking pixels (e.g., cookies) associated with the advertisement creative, and/or other info such as the size, pixel dimensions, and/or file type of the advertisement creatives in a particular advertisement block.

At step 164, data analysis and storage equipment 17 may trigger a rule violation analysis. Data analysis and storage equipment 17 may trigger a rule violation analysis in response to passage of a pre-determined amount of time (e.g., an hour, a day, a week, etc.) or in response to detection of a pre-determined advertiser, advertiser type, placement pathway, or other advertisement information detected at step 162.

At step 166, in response to the rule violation analysis trigger, data analysis and storage equipment 17 may apply an advertiser rule list such as rule list 88 of FIG. 5 to the detected advertisements and associated advertisers, placement pathways, and additional data detected at step 162 (e.g., by comparing the detected advertisements and associated advertisers, placement pathways, and additional data to rules in the rule list).

At step 168, data analysis and storage equipment 17 may detect advertiser rule violations based on the application of the advertiser rule list to the detected advertisements and associated advertisers, placement pathways, and additional data. However, the steps described above in connection with FIGS. 10 and 11 are merely illustrative. If desired, step 112 of FIG. 8 may be carried out using advertisement discovery equipment 12 (FIG. 1).

Figure 12:
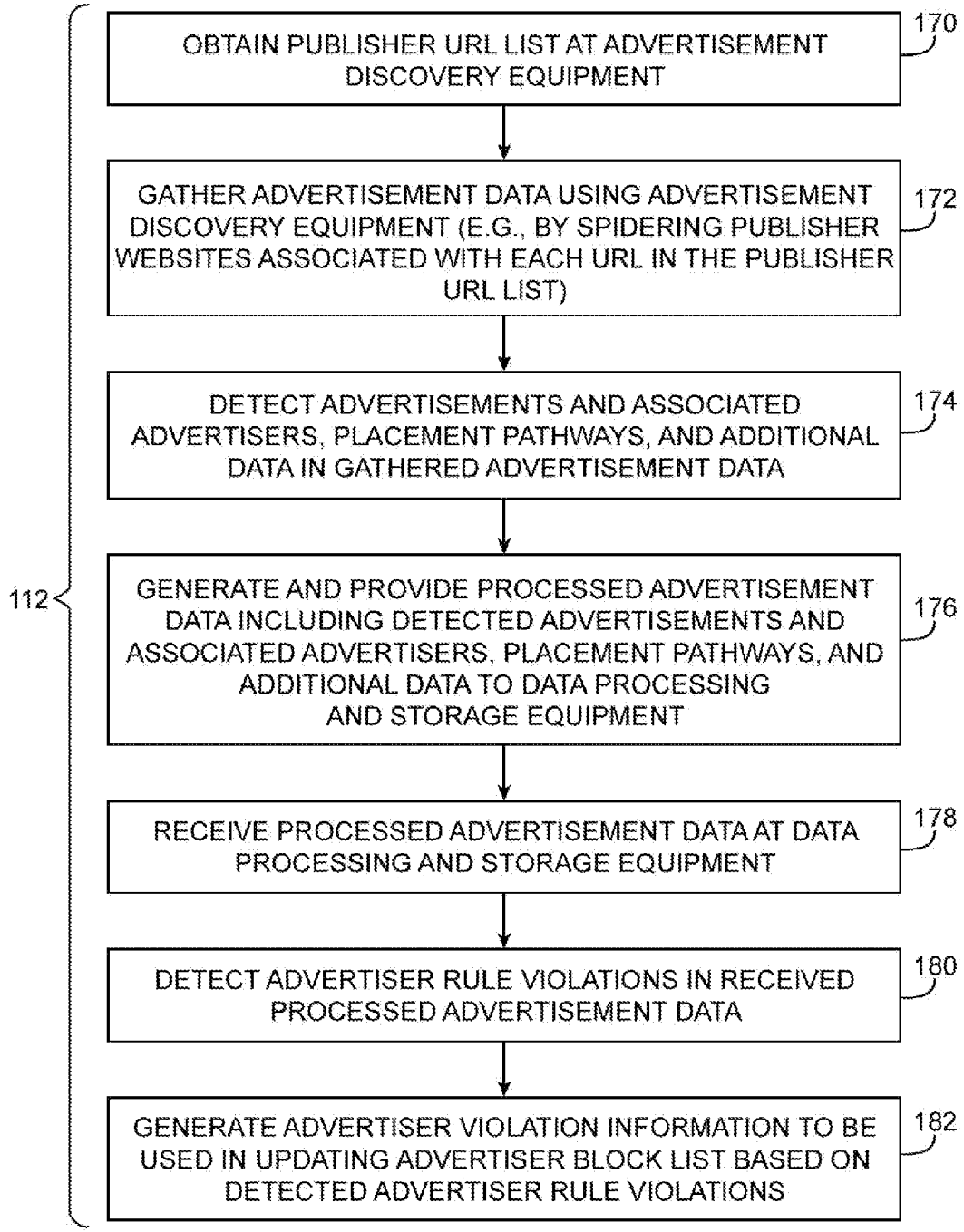
FIG. 12 is a flow chart of illustrative steps that may be used in performing advertisement violation detection operations using advertisement discovery equipment in accordance with an embodiment of the present invention.

Illustrative steps that may be involved in performing advertisement violation detection operations as described above in connection with step 112 of FIG. 8 using advertisement discovery equipment 12 are shown in FIG. 12.

At step 170, advertisement discovery equipment 12 of system 10 may be used to obtain a publisher URL list (e.g., a list of initial publisher websites to be explored). The publisher URL list may be obtained, for example, from a stored list of publisher URLs on cloud-based storage 14. However this is merely illustrative. If desired, advertisement discovery equipment 12 may generate the publisher URL list by crawling an initial publisher website and adding URLs of additional publisher websites that are linked to the initial publisher website. The initial publisher website may be obtained from cloud-based storage 14 or may be a previously crawled publisher website.

At step 172, advertisement discovery equipment 12 may gather advertisement data from one or more publisher websites associated with URLs in the publisher URL list. Advertisement discovery equipment 12 may, for example, use multiple web crawler applications to explore multiple publisher websites. The web crawler applications may gather advertisement data that includes a URL, a time, a response body, an HTTP response code, and a redirect response header associated with each request made by the web crawler application.

At step 174, advertisement discovery equipment 12 may detect advertisements and associated advertisers, placement pathways, and additional associated data such as advertiser cookies in the gathered advertisement data.

Advertisement discovery equipment 12 may detect the advertisements and associated advertisers, placement pathways and additional associated data such as advertiser cookies in the gathered advertisement data by detecting advertisements in request URLs, determining an advertisement request time associated with each detected advertisement, and searching response bodies and/or redirect response headers of other requests having times that are the same as or earlier than the advertisement request time to identify placement pathways by which discovered advertisements have been placed and to identify additional data (e.g., advertiser cookies) associated with each advertisement. Each placement pathway may include one or more advertising channels or combinations of advertising channels.

At step 176, advertisement discovery equipment 12 may generate processed advertisement data and provide the processed advertisement data to data analysis and storage equipment 17.

Advertisement discovery equipment 12 may generate processed advertisement data such as data trees and advertisement-block specific data. Data trees may include the identified placement pathways for advertisements (and other content) on each publisher website. Advertisement-block specific data may include advertiser names, advertisement creative files (e.g., image files), landing page info (e.g., a website of a company that sells or produced the advertised product), the location of the advertisement (e.g., pixel coordinates) on the publisher website, tracking pixels (e.g., cookies) associated with the advertisement creative, and/or other info such as the size, pixel dimensions, and/or file type of the advertisement creatives in a particular advertisement block.

At step 178, data analysis and storage equipment 17 may receive processed advertisement data from one or more implementations of advertisement discovery equipment 12.

At step 180, data analysis and storage equipment 17 may detect advertiser rule violations in the received processed advertisement data.

At step 182, data analysis and storage equipment 17 may be used to generate advertiser violation information to be used in updating a blocked advertiser list such as list 80 of FIG. 5 based on the advertiser rule violations detected at step 180.

Figure 13:
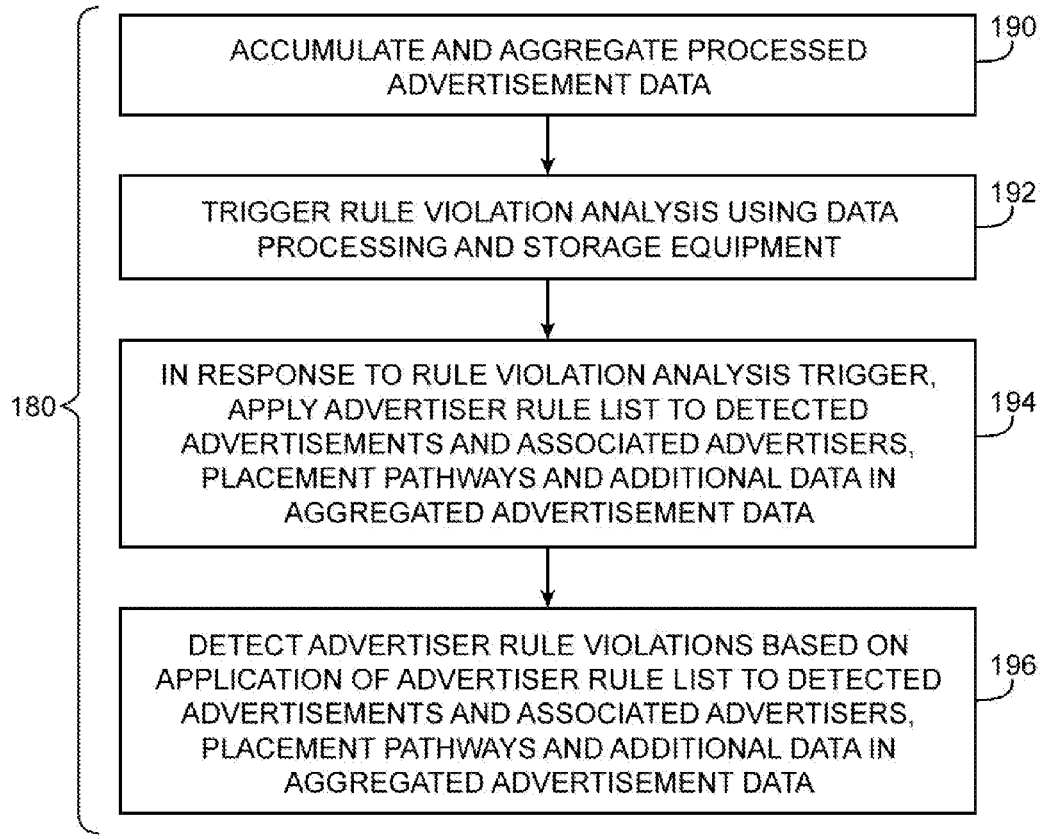
FIG. 13 is a flow chart of illustrative steps that may be used in detecting advertiser rule violations using processed advertisement data from advertisement discovery equipment in accordance with an embodiment of the present invention.

Illustrative steps that may be involved in detecting advertiser rule violations in received processed advertisement data as described above in connection with step 180 of FIG. 12 are shown in FIG. 13.

At step 190, data analysis and storage equipment 17 may be used to accumulate processed advertisement data from one or more implementations of advertisement discovery equipment 12 for a predetermined period of time. If desired, data analysis and storage equipment 17 may be used to aggregate (combined) advertising data associated with the advertisements and the placement pathways from multiple implementations of advertisement discovery equipment and from multiple periods of time from each implementation of advertisement discovery equipment 12.

At step 192, data analysis and storage equipment 17 may trigger a rule violation analysis. Data analysis and storage equipment 17 may trigger a rule violation analysis in response to passage of a pre-determined amount of time (e.g., an hour, a day, a week, etc.) or in response to detection of a pre-determined advertiser, advertiser type, placement pathway, or other advertisement information detected at step 174 (FIG. 12).

At step 194, in response to the rule violation analysis trigger, data analysis and storage equipment 17 may apply an advertiser rule list such as rule list 88 of FIG. 5 to detected advertisements and associated advertisers, placement pathways, and additional information in the aggregated data (e.g., by comparing the aggregated data to rules in the rule list).

At step 196, data analysis and storage equipment 17 may detect advertiser rule violations based on the application of the advertiser rule list to the detected advertisements and associated advertisers, placement pathways, and additional information in the aggregated data. However, the steps described above in connection with FIGS. 12 and 13 are merely illustrative. If desired, step 112 of FIG. 8 may be carried out using any suitable combination of steps described in connection with FIGS. 10, 11, 12, and/or 13 or other suitable steps for automatically discovering and blocking advertisements from appearing on websites.

The foregoing is merely illustrative of the principles of this invention and various modifications can be made by those skilled in the art without departing from the scope and spirit of the invention.

What is claimed is:

1. A method of automatically maintaining a list of advertisers to be blocked from placing advertisements on a publisher website using a system having advertisement discovery equipment and data analysis and storage equipment, the method comprising:
   with the data analysis and storage equipment, obtaining an initial list of blocked advertisers that are prohibited from placing advertisements on the publisher website;
   with the advertisement discovery equipment, performing advertisement violation detection operations by gathering and processing advertisement data associated with the publisher website, wherein performing the advertisement violation detection operations comprises identifying indirect placement pathways by which the advertisements were placed on the publisher website;
   with the advertisement discovery equipment, providing the processed gathered advertisement data to the data analysis and storage equipment;
   with the data analysis and storage equipment, automatically updating the initial list of blocked advertisers based on the performed advertisement violation detection operations.

2. The method defined in claim 1, further comprising: providing the updated initial list of blocked advertisers to an advertising network.

3. The method defined in claim 1, further comprising: providing the updated initial list of blocked advertisers to an advertising exchange.

4. The method defined in claim 3, wherein obtaining the initial list of blocked advertisers that are prohibited from placing advertisements on the publisher website comprises receiving the initial list of blocked advertisers from a publisher associated with the publisher website.

5. The method defined in claim 3, wherein obtaining the initial list of blocked advertisers that are prohibited from placing advertisements on the publisher website comprises:
   with the advertisement discovery equipment, obtaining an advertiser rule list;
   with the advertisement discovery equipment, gathering initial advertisement information associated with current advertisements on the publisher website; and
   with the advertisement discovery equipment, generating the initial list of blocked advertisers using the gathered initial advertisement information and the obtained advertiser rule list.

6. The method defined in claim 5 wherein obtaining the advertiser rule list comprises receiving the advertiser rule list from a publisher associated with the publisher website.

7. The method defined in claim 5 wherein obtaining the advertiser rule list comprises generating a default advertiser rule list using the advertisement discovery equipment.

8. The method defined in claim 1 wherein performing the advertisement violation detection operations by gathering and processing the advertisement data associated with the publisher website comprises:
   with the advertisement discovery equipment, loading the publisher website; and
   gathering the advertisement data associated with the publisher website by gathering data corresponding to requests made by the advertisement discovery equipment while loading the publisher website.

9. The method defined in claim 8 wherein performing the advertisement violation detection operations by gathering and processing the advertisement data associated with the publisher website further comprises:
   detecting at least one advertisement and at least one associated placement pathway in the gathered advertisement data; and
   generating processed advertisement data that includes the at least one advertisement and the at least one associated placement pathway.

10. The method defined in claim 1, further comprising:
    providing the processed advertisement data to the data analysis and storage equipment; and
    with the data analysis and storage equipment, detecting advertiser rule violations using the processed advertisement data and advertiser rule list.

11. A method of automatically maintaining a list of advertisers to be blocked from placing advertisements on a publisher website using a system having script generation and execution equipment and data analysis and storage equipment, the method comprising:
    with the data analysis and storage equipment, obtaining an initial list of blocked advertisers that are prohibited from placing advertisements on the publisher website;
    with the script generation and execution equipment, instructing a web browser of a user of the publisher website to gather advertisement data associated with the publisher website;
    with the script generation and execution equipment, instructing the web browser of the user of the publisher website to transmit the gathered advertisement data to the data analysis and storage equipment;
    with the data analysis and storage equipment, performing advertisement violation detection operations using the transmitted gathered advertisement data, wherein performing the advertisement violation detection operations comprises identifying indirect placement pathways by which advertisements were placed on the publisher website; and
    with the data analysis and storage equipment, automatically updating the initial list of advertisers based on the performed advertisement violation detection operations.

12. The method defined in claim 11 wherein instructing the web browser of the user of the publisher website to gather the advertisement data associated with the publisher website comprises:

with the script generation and execution equipment, generating a publisher-specific monitoring script;

with the script generation and execution equipment, providing a link associated with the publisher-specific monitoring script to the publisher website; and with the script generation and execution equipment, instructing the web browser of the user of the publisher website to gather the advertisement data associated with the publisher website using the publisher-specific monitoring script.

13. The method defined in claim 12 wherein instructing the web browser of the user of the publisher website to transmit the gathered advertisement data to the data analysis and storage equipment comprises using the publisher-specific monitoring script to instruct the web browser of the user of the publisher website to transmit the gathered advertisement data to the data analysis and storage equipment.

14. The method defined in claim 11 wherein performing the advertisement violation detection operations using the transmitted gathered advertisement data comprises:

receiving the transmitted gathered advertisement data at the data analysis and storage equipment; and with the data analysis and storage equipment, detecting advertiser rule violations in the received advertisement data.

15. The method defined in claim 14 wherein detecting the advertiser rule violations in the received advertisement data comprises:

identifying advertisements in the received advertisement data; and applying a set of rules in an advertiser rule list to the identified advertisements and associated indirect placement pathways.

16. The method defined in claim 15 wherein detecting the advertiser rule violations in the received advertisement data further comprises:

comparing the set of rules in the advertiser rule list with the identified advertisements and the associated indirect placement pathways.

17. The method defined in claim 16 wherein identifying the advertisements and associated placement pathways in the received advertisement data comprises identifying the advertisements and the associated placement pathways using at least one time associated with the identified advertisement in the received advertisement data.

18. An advertisement discovery and blocking system, comprising:

data analysis and storage equipment configured to use an advertiser rule list and advertisement data associated with advertisements on a website to block selected advertisers from placing additional advertisements on the website; and computing equipment configured to generate the advertisement data by detecting the advertisements and determining placement pathways by which the advertisements were placed on the website and to provide the advertisement data associated with the advertisements on the website to the data analysis and storage equipment, wherein the computing equipment is configured to determine the placement pathways by which the advertisements were placed on the website in part by determining an advertisement request time associated with each detected advertisement and an additional request associated with the website, wherein a given detected advertisement has a first request time, wherein the additional request has a second request time that is earlier than the first request time, and wherein the computing equipment is further configured to determine the placement pathways by which the advertisements were placed on the website in part by searching a response body of the additional request.

19. The advertisement discovery and blocking system defined in claim 18 wherein the computing equipment comprises advertisement discovery equipment configured to run at least one web crawler application that loads the website and gathers the advertisement data from the website.

20. The advertisement discovery and blocking system defined in claim 19 wherein the computing equipment comprises script generation and execution equipment configured to generate and execute a script that instructs web browsers of viewers of the website to gather the advertisement data from the website.

* * * * *